United States Patent [19]

Khalil

[11] 4,003,153
[45] Jan. 18, 1977

[54] FISHING ROD MOUNTED LINE-DETAINING DEVICE

[76] Inventor: James E. Khalil, 6511 Marsol Road, Apartment 204, Mayfield Heights, Ohio 44122

[22] Filed: Jan. 12, 1976

[21] Appl. No.: 647,881

[52] U.S. Cl. .................................................. 43/25
[51] Int. Cl.² ........................................ A01K 87/00
[58] Field of Search ................... 43/25, 25.2, 15

[56] References Cited
UNITED STATES PATENTS

| 664,889 | 1/1901 | Ogimura | 43/25 |
| 3,057,106 | 10/1962 | Wheeler | 43/25 |
| 3,654,722 | 4/1972 | Camilleri | 43/25 |

Primary Examiner—Warner H. Camp
Attorney, Agent, or Firm—W. W. Portz

[57] ABSTRACT

The device is adapted for mounting on a fishing rod and includes a guided slide bar having a head portion provided with a notch for releasably gripping a fishing line and releasing the line as the line becomes subjected to tension sufficient to set the hook in the mouth of a fish.

8 Claims, 7 Drawing Figures

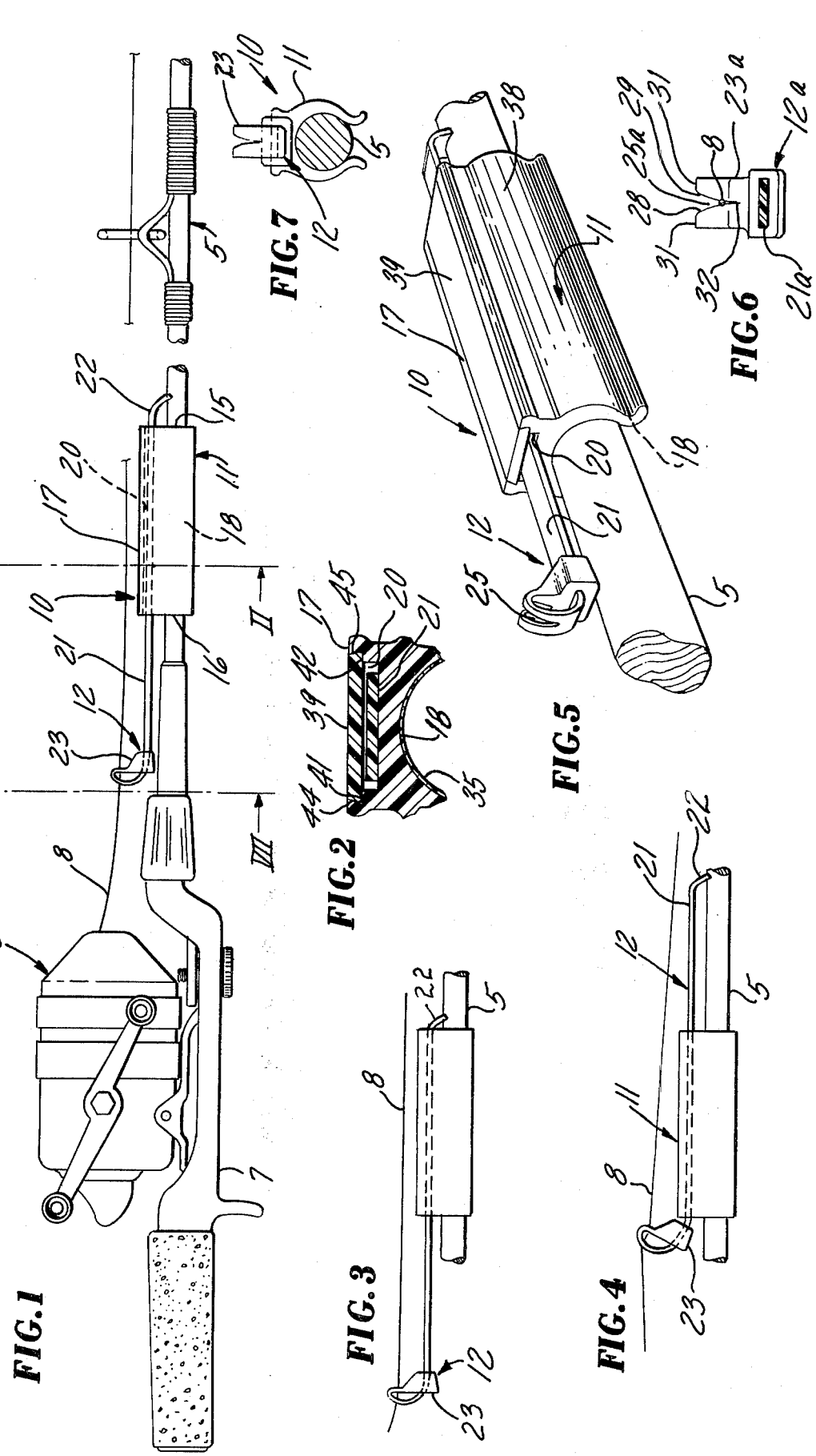

4,003,153

FISHING ROD MOUNTED LINE-DETAINING DEVICE

BACKGROUND OF THE INVENTION

There are various known hook-setting devices which may be mounted on a fishing rod. In view of the present invention, it may be generally viewed that such prior devices are unnecessarily complicated and provide hook-setting reactions which are unnecessarily vigorous, such as the tripping of a line-jerking mechanism. This invention is based on the experience that only light and sudden line tension is required to set the hook in the fish's mouth.

It is an important object of this invention to provide a hook-setting accessory for a fishing rod that is very successful in function and much less expensive than the prior art devices.

Another object is to provide a device that is so small, inexpensive and easy to install as to be a nearly disposable item carried in any quantity desired in the fisherman's coat pocket or equipment box.

It is a further object to provide a hook-setting device which readily releases the fishing line once the hook is set.

SUMMARY OF THE INVENTION

The invention, in brief, achieves the above objects in a device comprising a support body attachable to a fishing rod, and a line-gripping slide member in slidable entrapped guide relation with the body. The body is contoured along its underside to approximately fit a longitudinal portion of a fishing rod. Upwardly from the undersurface within the body, a guideway extends elongately in the lengthwise direction of the body and the fishing rod. The member comprises, preferably, a flat elongate strip or bar portion terminating at its rear end in a slotted line-receiving head portion and at its front end in a detent portion consisting of any enlargement of, or structure in transverse relation to, the bar portion capable of engaging a front area of the body as a stop terminating rearward movement of the member relative to the body. The head portion has a notch open at the top of which the sides taper downwardly at a small angle to an apex enabling the sides to grip in a frictional pinching manner a fishing line extending linearly therethrough after having been manually pressed thereinto.

As one feature, the notch is located outwardly, usually upwardly, from the axis of the bar portion to cause a bending force on the bar portion when the line fastened therin is subjected to a pull from the front direction of the rod. If the bar portion is sufficiently flexible, the head portion, on engaging the rear end surface of the body during operation, will tilt forward to allow tension exerted by a fish, presumably now hooked, to pull the line out of the notch to thus permit unrestricted line pay-out operation of the fishing rod reel.

DESCRIPTION OF THE DRAWING

FIG. 1 is a fragmentary side view of a fishing rod and reel equipped with the line-retaining device of the invention.

FIG. 2 is a fragmentary cross sectional view taken along line II—II of FIG. 1.

FIG. 3 is a fragmentary side elevation of the line-retaining device of FIGS. 1 and 2 showing the line-gripping member rearwardly retracted in preparation for a fish strike.

FIG. 4 is a view similar to FIG. 3 except that the line-gripping member is shown in its forward hook-setting position.

FIG. 5 is a fragmentary view depicting a mode of attachment of the line-retaining device to the fishing rod.

FIG. 6 is a rear end view of a modified slide bar for a device in accordance with the invention.

FIG. 7 is a fragmentary rear end view of the line-gripping device taken along line VII—VII of FIG. 1.

DESCRIPTION OF PREFERRED EMBODIMENTS

FIG. 1 illustrates a fishing rod 5, a reel 6 attached to the handle portion 7 of the rod, a line 8 extending outwardly of the reel 6 toward the front or distal end of the rod 5, and the line-detaining device 10 of this invention. The device 10 comprises a body 11 and a line-gripping slide member 12. The body 11 is of simple block configuration, elongated in the direction of the length of the fishing rod 5 and having a front end surface 15, a rear end surface 16, an upper surface 17, and an upper surface 18 on the side opposite the upper surface. The body 11 has a straight elongate guideway 20 extending in its lengthwise direction from one end surface of the body to the other.

The slide member 12 comprises a generally straight strip or bar portion 21 terminating at its front end in a down-turned portion or detent 22, and at its rear end in a head portion 23. The bar portion 21 extends through the guideway 20. As FIG. 2 shows, the transverse cross sections of both the bar portion 21 and the guideway 20 are rectangular and elongate with the bar portion filling the guideway sufficiently both horizontally and vertically to permit very little horizontal or vertical angling movements of the member 12 relative to the body 10 or rotative movement of the bar portion about its longitudinal axis within the guideway.

The bar portion 21 is substantially longer than the body 11, approximately twice as long as shown, to allow the fish to take the hook an commence its movement and gain momentum away from the hook position.

FIG. 3 illustrates the position of the line-gripping member 12 at its most rearward position corresponding to a situation wherein the bated hook (not shown) is in the water at rest. As the fish strikes and puts tension on the line 8, the member 12 is drawn forwardly to cause an area of the head portion 23 to engage an area of the rear end surface 16 of body 11 surrounding the guideway 20. As this happens, the section of the bar-portion adjacent to the head portion 23 may bend resiliently as shown to allow the head portion 23 to tilt forward if the line 8 has been so firmly inserted into a notch 25 of the head portion 23 as to be difficult to pull through the notch. The tilting of the head permits a more direct pull on the line in the diverging direction of the notch sides to dislodge the line. Thus, in normal operation of the device 10, the line 8 will jerk free of the notch as the fish continues its course and draws line from the reel 6. Release of the line is essential in order that the line may not on many occasions be broken, or the rod separated from an unwary fisherman.

To illustrate a preferred construction of the notch, FIG. 6 shows the rear end of a line-gripping member 12a having a generally dihedral of V-shaped notch 25a in a head portion 23a. Elements of member 12a corresponding to elements of member 12 are identified by the same number except for the addition of *a*. The opposite sides 28, 29 of the notch are relatively wide apart at the top of the crest surface 31. To maximize pinching action of the line 8, however, the sides 28, 29 are of convex contour as they converge toward a plane generally bisecting the notch, extending in the longitudinal direction of the bar portion 21*a*, and containing the apex 32 of the notch. A notch constructed in this manner is capable of tight frictional gripping action on commercially available fishing lines over a large range of commonly used line deniers. As shown in both embodiments, the head portion of the line-gripping member extends laterally toward and through the plane of the upper surface of the body to terminate laterally in a crest surface.

As shown most clearly in FIGS. 5 and 7, the body 11 is constructed with an undersurface 18 which is arcuate and has an arcuate length of greater than 180° about its center of revolution at the center of the rod 5. When the body 11 is made of a resiliently flexible material such as compositions essentially of rubber, polyethylene, or polyvinylchloride, the device 10 may be thrust onto the rod from a lateral direction to radially entrap the rod. If desired, the undersurface 18 of the body may be coated with a tacky coating 35 which will cause the device 10 to establish an adhesive bond with the rod. As a very simple expedient, the body may be constructed of wood or other non-resilient material with an undersurface of less arcuate length than 180 degrees and tapered to the rod.

According to one method of manufacturing the device 10, the body 11 my be constructed as two pieces, i.e., a body element 38 and cover strip 39 as shown in FIGS. 2 and 5. Accordingly, the body element 38 is grooved longitudinally inwardly from the top surface 17 to form the guideway 20 at the deepest portion of the groove. The groove has an upper wider longitudinally extending recess at surfaces 41, 42 extending laterally outwardly from both sides of the top of the guideway 20.

The strip 39 may be constructed as shown with its side edges 44, 45 in concavo-convex relation with the corresponding side surface of the recess defined by surfaces 41, 42. The strip is merely pressed into the operative position shown and if constructed to an accurate tight fit, is frictionally retained in the recess against longitudinal movement. With the body constructed in this manner, the prefabricated slide member can be placed in the guideway before placing the strip 39 in operative position.

Another method of manufacture is to prepare the body 11 as a single piece, insert a piece of straight stock providing the slide member 12 equipped with a head portion formed thereon, and bend the front end of the stock piece to provide a front detent. The head portion can also be formed and notched from a portion of the straight stock piece. The notched head portions of the line-gripping members shown are exemplary of line-gripping means in general that may releaseably grip a fishing line so that the line may be automatically withdrawn from a notch or a resilient means, such as spring clamps, during a fish strike or be manually plucked from the gripping means.

What is claimed is:

1. A line-detaining device for attachment to a fishing rod comprising:
   a support body having an upper surface and an undersurface at opposite sides thereof, said undersurface being adapted in the lengthwise sides thereof, said undersurface being adapted in the lengthwise direction of the body to engage a longitudinal surface of a fishing rod with the rear end of the body nearer the handle and reel of the fishing rod, said body having an elongate guideway extending in said lengthwise direction through said body;
   a slide member having a substantially straight elongate bar portion of a length substantially exceeding that of the passageway, a head portion connected with the rear end of the bar portion, and a detent portion connected with the front end of the bar portion, said head detent portions being arranged in lateral directions relative to the bar portion to engage said body at opposite ends of the guideway to limit the member to a range of movement relative to the body, said head portion extending laterally from the bar portion to terminate in a crest surface;
   said head portion having line-gripping means for receiving a line inwardly from said crest surface which enables a fishing line to be pinched and frictionally gripped by said head portion.

2. The device of claim 1 wherein:
said line-gripping means comprises a head portion defining a V-shaped notch tapering away from said crest surface with respect to a plane bisecting the notch extending in parallel relation with the bar portion, said notch being of a width at said crest surface to receive a fishing line with the sides thereof tapering toward an apex to a width less than the thickness of said fishing line.

3. The device of claim 2 wherein:
said bar portion is resiliently flexible adjacent said head portion to enable tilting forward of the head portion as fishing-line tension is applied.

4. The device of claim 3 wherein:
the front surface of said head portion inclines rearwardly and upwardly from said bar portion to enable the head portion to tilt forward along an area thereof immediately adjacent to where the bar portion engages the rear end of the body during operation.

5. The device of claim 2 wherein:
said body comprises a resilient material and said undersurface is formed as an arcuate recess of greater than 180° in arc length adapting the body to surround and grip a longitudinal section of a fishing rod.

6. The device of claim 2 wherein:
said body comprises a body element grooved longitudinally inwardly from said top surface to form said guideway as the deepest portion of the groove and an upper wider longitudinal recess extending laterally outwardly from both sides of the top of the guideway;
a cover strip of generally mating contour with said recess, said strip having said edges in mating relation with the side walls of said recess;
and retaining means for securing said strip in said recess.

7. The device of claim 8 wherein:
said retaining means consists of said strip having side edges in concavo-convex relation with the side walls of said recess, and said strip and recess are formed to a tight fit sufficient to cause frictional retention of said strip from lengthwise movement within the recess.

8. The device of claim 6 wherein:
said retaining means consists of an adhesive for bonding said strip to surfaces of said recess.

* * * * *

UNITED STATES PATENT AND TRADEMARK OFFICE
CERTIFICATE OF CORRECTION

PATENT NO. : 4,003,153
DATED : 01/18/77
INVENTOR(S) : James E. Khalil

It is certified that error appears in the above-identified patent and that said Letters Patent are hereby corrected as shown below:

Column 2, line 24, change "upper surface" to --under surface--.

Column 2, line 67, change "of" to -- or --.

Column 3, lines 68 and 69, delete "said undersurface being adapted in the lengthwise sides thereof,".

Column 4, line 12, after "head" insert -- and --.

Signed and Sealed this

Nineteenth Day of April 1977

[SEAL]

Attest:

RUTH C. MASON
Attesting Officer

C. MARSHALL DANN
Commissioner of Patents and Trademarks